Patented Jan. 6, 1948

2,434,060

UNITED STATES PATENT OFFICE 2,434,060

TETRAACETYLRIBONAMIDE AND PROCESS OF MAKING IT

Max Tishler, Rahway, N. J., assignor to Merck & Co., Inc., Rahway, N. J., a corporation of New Jersey No Drawing. Application July 26, 1945, Serial No. 607,261

2 Claims. (Cl. 260—488)

This invention relates to new chemical compounds and to processes for preparing the same, and is a continuation-in-part of copending application Serial No. 394,505, filed May 21, 1941, now Patent No. 2,409,455, issued October 15, 1946, which in turn is a continuation in part of the then copending application Serial No. 325,182, filed March 21, 1940, now Patent 2,261,608, issued November 4, 1941.

The present invention relates to the synthesis of certain novel acylated ribonyl compounds that are useful as intermediates in the synthesis of the vitamin riboflavin. These novel compounds according to this invention are represented by the general formula:

wherein R is an acyl group. In accordance with this invention, these novel compounds are prepared by reactions represented as follows, R again representing an acyl group:

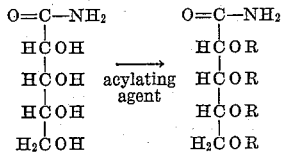

It is now discovered, according to this invention, that tetraacyl ribonamide may be obtained by acylating ribonamide; tetraacyl ribonic acid may be obtained by treating tetraacyl ribonamide with an oxide of nitrogen; and that a tetraacyl ribonyl halide may be obtained by treating a tetraacyl ribonic acid or salt thereof, with a halide or oxyhalide of phosphorus or sulfur.

The tetraacyl ribonyl halide compound may be reduced to tetraacyl ribose which may then be used in the synthesis of riboflavin.

The following examples illustrate methods of carrying out the present invention, but it is to be understood that these examples are given by way of illustration and not of limitation.

Example 1

Fifteen grams of ribonamide are added to a mixture of 74 cc. of acetic anhydride and 75 cc. of dry pyridine. The suspension is warmed with agitation until the solid dissolves. The solution is allowed to stand overnight at room temperature. The tetraacetyl ribonamide which crystallizes out of the reaction mixture is filtered off. Yield (first crop) =14.7 g.; M. P. 124-5° C.

The filtrate is added with stirring to 200 cc. of ice water and allowed to stand in an ice bath for one hour. A second crop is filtered off, and washed with water, followed by 95% alcohol and ether. Yield (second crop) =6.3 g.; M. P. 123.5–124.5° C.

The filtrate from the second crop is extracted with 4×50 cc. of chloroform. The chloroform extract is washed with dilute (5%) sodium bicarbonate solution, then with water, the chloroform solution is then dried over Na₂SO₄, and evaporated under reduced pressure to dryness. The residue is washed with ether. Yield (third crop) =3.2 g.; M. P. 123–123.5° C. Total yield= 24.2 g. or 80% of theory.

Example 2

Twenty-six grams of cadmium ribonate (prepared from calcium d-arabonate by epimerization) are dissolved in 150 cc. of water, by heating on a steam bath. While the mixture is being heated to 60–70° C., hydrogen sulfide is passed into the solution with stirring until a filtered test portion no longer reacts with hydrogen sulfide. The mixture is filtered and the cadmium sulfide washed with hot water. The washings and filtrates are combined and concentrated under reduced pressure to dryness. The residue is then heated at 80–90° C. under reduced pressure for one hour. The syrupy lactone on standing slowly crystallizes but for subsequent operations, the syrup may be used without any purification.

The syrupy ribonic acid lactone is dissolved in 150 cc. of absolute alcohol by warming. The solution is then cooled to 5° C., and while stirring, a solution containing two equivalents of ammonia and methyl alcohol is added dropwise. The mixture immediately becomes turbid and the product begins to separate very soon. As soon as the product begins to separate, the rate of ammonia addition may be greatly increased. The mixture is allowed to stand at between 0° and 5° C. for two hours after all the ammonia has been added, is then filtered, and the d-ribonamide obtained as a residue is washed with cold methyl alcohol. Yield, 16.5 to 17.5 g., M. P. 138–139° C., with decomposition. An additional small crop of product may be obtained by concentrating the mother liquor under reduced pressure. Methyl alcohol may also be used as a solvent with no difference in yield.

A mixture of 10 g. of d-ribonamide, 38 cc. of acetic anhydride and 50 cc. of dry pyridine is heated on a steam bath until solution occurs, and then for an additional 15 minutes. The solution is then allowed to stand for ½ hour at room temperature. Ice is added together with seeds of the acetylated amide. After filtering off the crystalline material, the mother liquor is extracted with chloroform, washed, dried, and concentrated. The residue is taken up in ether and diluted with petroleum ether whereby an additional yield of product separates. The tetraacetyl d-ribonamide may be purified by recrystallization from methyl alcohol and melts at 125–6° C. Yield 82%.

Alternatively, a mixture of 200 g. of d-ribonamide, 175 g. of fused zinc chloride, and 1200 cc. of acetic anhydride is stirred at 5° C. for two hours. During this time the ribonamide dissolves. The mixture is then placed in the cold room at about 3° C. for ten hours. The solution, which becomes dark on standing, is poured into three liters of ice water, and, while stirring and maintaining the temperature below 25° C., a solution of 260 g. of sodium hydroxide in 500 cc. of water is added. The mixture is then filtered and the product recrystallized. An additional quantity of product may be obtained from the mother liquor by extracting with chloroform and proceeding as described above. Yield 227 g.

*Example 3*

10 grams of ribonamide is added in small portions over a period of one hour to a mixture of 45 cc. of propionic anhydride and 10 cc. of pyridine which is stirred and maintained at 96° C. After all of the ribonamide has been added the mixture is kept at between 90–95° for an additional half-hour. The solution is cooled and allowed to stand overnight at 0° C. The crystals which separate are filtered and washed with cold absolute alcohol. On recrystallization from absolute alcohol, the product, tetrapropionyl ribonamide, is obtained. (M. P. 124.5—125.5° C.)

*Example 4*

10 grams of ribonamide is added in small portions over a period of one hour to a mixture of 55 cc. of butyric anhydride and 10 cc. of pyridine which is stirred and maintained at 105° C. After all of the ribonamide has been added the mixture is kept between 100–105° C. for an additional half-hour. The solution is cooled and allowed to stand overnight at 0° C. The crystals which separate are filtered and washed with cold absolute alcohol. On recrystallization from absolute alcohol, the product, tetrabutyryl ribonamide, is obtained. (M. P. 93.5–94° C.).

*Example 5*

A mixture of about 34 cc. of acetic anhydride and about 10 g. of pyridine is stirred and heated to approximately 60° C. A total of 10 g. of solid ribonamide is added in small portions within one hour. Considerable heat is evolved in this reaction; therefore, the mixture is cooled from the outside and the reaction temperature of 60° is maintained by the rate of addition of ribonamide. The temperature has to be checked continuously since a temperature rise may occur rather suddenly. After all of the ribonamide has been added, the mixture is kept between 55° and 60° for half an hour. At this point the solution should be clear and colorless; it is cooled to 0° C. and kept there for 2 hours with stirring. The tetraacetyl ribonamide is then filtered and washed with absolute ethanol which has previously been cooled to 0° C. There should be no odor of pyridine or acetic anhydride in the first crop. The filtrate and the alcohol wash are kept separately. The filtrate is concentrated as soon as possible and a second crop is obtained by cooling the concentrate to 0° C. for 2 hours. This is filtered and washed like the first crop. If the volume of filtrate is considerable, it should be concentrated for a third crop. The combined alcohol washings are also concentrated and will yield a small amount of tetraacetyl ribonamide. The tetraacetyl ribonamide is air dried at 50°. Yield=90% theory. (M. P. 122–124° C.)

Other tetraacyl ribonamides can be obtained by reacting different aliphatic or aromatic acids, acid anhydrides, or acid halides, with ribonamide as above described. For example, tetrabenzoyl ribonamide may be obtained by reacting a benzoyl halide or benzoic anhydride with ribonamide.

Modifications may be made in carrying out the present invention without departing from the spirit and scope thereof, and the invention is to be limited only by the appended claims.

What is claimed is:

1. Tetraacetylribonamide.
2. The process that comprises reacting ribonamide with acetic anhydride in the presence of zinc chloride to produce tetraacetylribonamide.

MAX TISHLER.

REFERENCES CITED

The following references are of record in the file of this patent:

UNITED STATES PATENTS

| Number | Name | Date |
|---|---|---|
| 2,237,263 | Pasternack et al. | Apr. 1, 1941 |